US012015186B2

(12) United States Patent
Yousefbeiki

(10) Patent No.: US 12,015,186 B2
(45) Date of Patent: Jun. 18, 2024

(54) GLAZING UNIT WITH ANTENNA UNIT

(71) Applicants: AGC GLASS EUROPE, Louvain-la-Neuve (BE); AGC INC., Chiyoda-ku (JP); AGC FLAT GLASS NORTH AMERICA INC., Alpharetta, GA (US); AGC VIDROS DO BRASIL LTDA, Sao Paulo (BR)

(72) Inventor: Mohsen Yousefbeiki, Gosselies (BE)

(73) Assignees: AGC GLASS EUROPE, Louvain-la-neuve (BE); AGC INC., Chiyoda-ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 215 days.

(21) Appl. No.: 17/422,331

(22) PCT Filed: Jan. 31, 2020

(86) PCT No.: PCT/EP2020/052382
§ 371 (c)(1),
(2) Date: Jul. 12, 2021

(87) PCT Pub. No.: WO2020/157251
PCT Pub. Date: Aug. 6, 2020

(65) Prior Publication Data

US 2022/0109221 A1 Apr. 7, 2022

(30) Foreign Application Priority Data

Jan. 31, 2019 (EP) .................................... 19154761

(51) Int. Cl.
*H01Q 1/12* (2006.01)
*H01Q 1/00* (2006.01)
*H01Q 1/02* (2006.01)

(52) U.S. Cl.
CPC ............... *H01Q 1/002* (2013.01); *H01Q 1/02* (2013.01); *H01Q 1/1271* (2013.01)

(58) Field of Classification Search
CPC ........ H01Q 1/002; H01Q 1/02; H01Q 1/1271; H01Q 1/38; H01Q 1/007; H01Q 1/44
See application file for complete search history.

(56) References Cited

U.S. PATENT DOCUMENTS 5,760,744 A 6/1998 Sauer
2003/0112187 A1* 6/2003 Whitehouse ............ H01Q 1/42 343/702

(Continued)

FOREIGN PATENT DOCUMENTS

EP 1 559 167 A1 8/2005
EP 2 833 474 A1 2/2015
WO WO 2004/038855 A1 5/2004

OTHER PUBLICATIONS

International Search Report dated Mar. 20, 2020 in PCT/EP2020/052382 filed Jan. 31, 2020.

*Primary Examiner* — Awat M Salih
(74) *Attorney, Agent, or Firm* — Oblon, McClelland, Maier & Neustadt, L.L.P.

(57) ABSTRACT

A glazing unit extends along a plane, P, defined by a longitudinal axis, X, and a vertical axis, Z; having a width, W, measured along the longitudinal axis, X, and a length, L, measured along the vertical axis, Z, and includes at least a glass panel and an antenna unit. The antenna unit includes an antenna. The antenna unit also includes a fixing portion for fixing the antenna to the glass panel so that a space, S, through which air can flow is formed between the glass panel and the antenna. At least one non-fixing portion and at least one metallic element are placed over at least a part of the non-fixing portion of the antenna unit.

14 Claims, 13 Drawing Sheets

(56) References Cited

U.S. PATENT DOCUMENTS

| | | | |
|---|---|---|---|
| 2003/0142018 | A1 | 7/2003 | Lange |
| 2006/0202897 | A1 | 9/2006 | Roquiny |
| 2016/0172765 | A1 | 6/2016 | Motta-Cruz et al. |

* cited by examiner

GLAZING UNIT WITH ANTENNA UNIT

TECHNICAL FIELD

The present invention relates to a glazing unit with an improved antenna unit.

BACKGROUND ART

Various communication systems based on wireless technologies such as cellular communication, radio broadcasting, GPS (Global Positioning System) are being developed. In order to deal with these communication systems, an antenna capable of transmitting and receiving electromagnetic waves used for each communication system is required.

In recent years, with miniaturization, antennas are increasingly installed in buildings. A large number of antennas are installed in the building so that electromagnetic waves used for mobile communications can be transmitted and received in a stable manner. When installing the antenna in the building, it is necessary to select the proper placement of the antenna so that electromagnetic waves can be transmitted and received stably while preventing the appearance of the building from being impaired.

In addition, in order to increase the speed and capacity of wireless communication, frequency bands to be used are becoming higher, like the frequency bands for the 5th generation mobile communication system (5G). Therefore, even if a high-frequency electromagnetic wave having a broadband frequency band is used for a mobile communication, etc., it is necessary to install a larger number of antennas in order to stably perform electromagnetic wave transmission and reception.

As an antenna unit to be installed and used in a building, for example, there are three layers having different relative dielectric constants, each layer is set to a predetermined thickness, and a radio wave transmitting body as described in the patent application JP06196915.

However, according to the technique described in JP06196915, there is a case where the temperature of the first layer excessively rises when the sunlight hits the first layer, depending on the installation place or the installation condition of the antenna unit and the like, It has not been studied that there is a possibility of thermal cracking in the first layer of the permeable member.

An object of one embodiment of the present invention is to provide a glass antenna unit capable of reducing the possibility of occurrence of thermal cracking in a glass panel while the back radiation of the waves from the structure due to reflection from the glass panel has to be minimized.

SUMMARY OF INVENTION

It is an object of the present invention to alleviate these problems, and to provide a glazing unit which reduces the reflection of the waves radiated by the antenna from the glass panel while reducing the possibility of occurrence of thermal cracking in the glass panel.

According to a first aspect of the invention, the invention relates to an improved glazing unit extending along a plane, P, defined by a longitudinal axis, X, and a vertical axis, Z; having a width, W, measured along the longitudinal axis, X, and a length, L, measured along the vertical axis, Z, comprising at least a glass panel and an antenna unit.

The solution as defined in the first aspect of the present invention is based on the antenna unit comprises an antenna, a fixing portion for fixing the antenna to the glass panel so that a space through which air can flow is formed between the glass panel and the antenna, at least one non-fixing portion and at least one metallic element placed on the non-fixed portion of the antenna unit.

The solution as defined in the first aspect of the present invention is based on the antenna unit comprises an antenna, a fixing portion for fixing the antenna to the glass panel so that a space through which air can flow is formed between the glass panel and the antenna, at least one non-fixing portion and at least one metallic element placed over at least a part of the non-fixing portion of the antenna unit.

According to the invention, the antenna unit may comprises two non-fixing portions. The antenna unit further comprises a metallic element placed over at least a part of at least one of the non-fixing portion.

In some embodiments, the antenna unit comprises two metallic elements, one of the metallic element is placed over at least a part of one of the non-fixing portion and the other of the antenna unit and the other one of the metallic elements is placed over at least a part of the second non-fixing portion of the antenna unit.

In preferred embodiments, the at least one metallic element further comprises at least a hole.

In some preferred embodiments, the at least one metallic element further comprises several holes.

In some more preferred embodiments, the at least one metallic element may comprises at least a meshed portion (15).

In some preferred embodiment, the largest dimension of the at least one hole of the at least one metallic element further is at most 0.4 times the effective wavelength.

In some preferred embodiment, the largest dimension of every hole of the at least one metallic element is at most 0.4 times the effective wavelength.

In some preferred embodiment, the largest dimension of the every hole of every metallic element further is at most 0.4 times the effective wavelength to minimize back reflection.

In some embodiments, the at least one metallic element may be over the entire non-fixing portion.

According to the invention, the glass panel may comprises at least one glass sheet.

In some preferred embodiments, the glass panel may comprise two glass sheets separated by a spacer. The space between these two glass sheets is fill with gas such as argon to improve the thermal insulation of the glazing unit.

In some more preferred embodiments, the glass panel comprises a coating layers system to improve the thermal insulation of the glazing unit.

It is noted that the invention relates to all possible combinations of features recited in the claims or in the described embodiments.

The following description relates to an building window unit but it's understood that the invention may be applicable to others fields like transportation windows which have to be attached such as train.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

Figure 1:
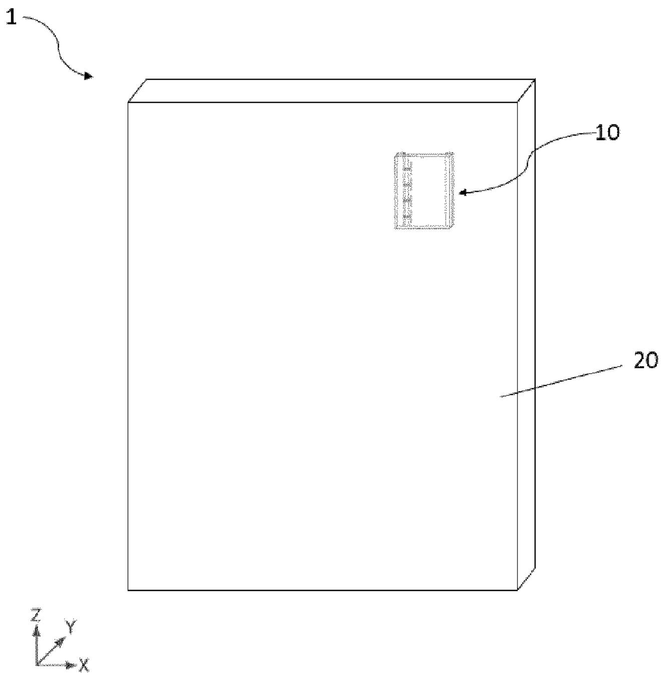
FIG. 1 is a schematic view of a glazing unit according to an exemplifying embodiment of the present invention.
Figure 2:
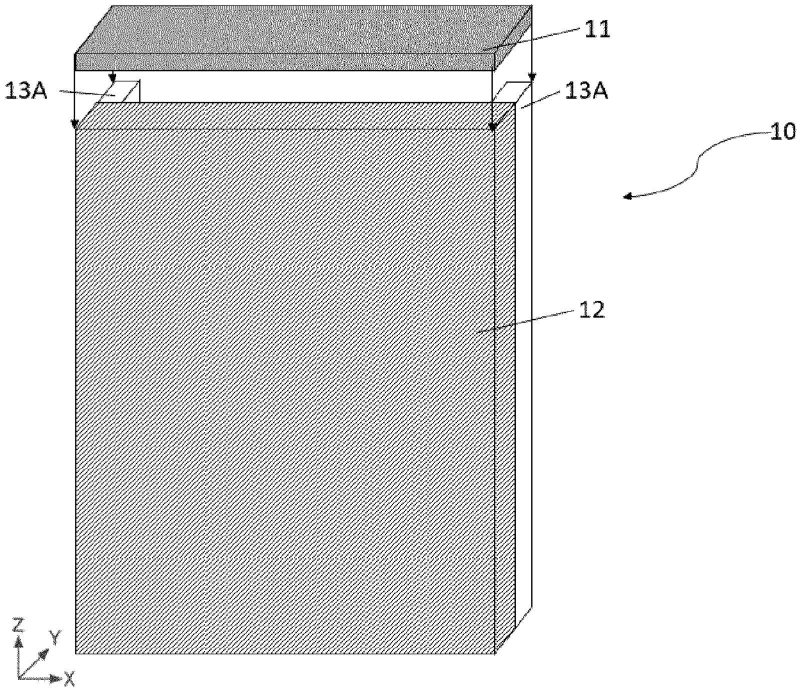
FIG. 2 is a schematic and semi-exploded view of an antenna unit according to the invention.
Figure 3:
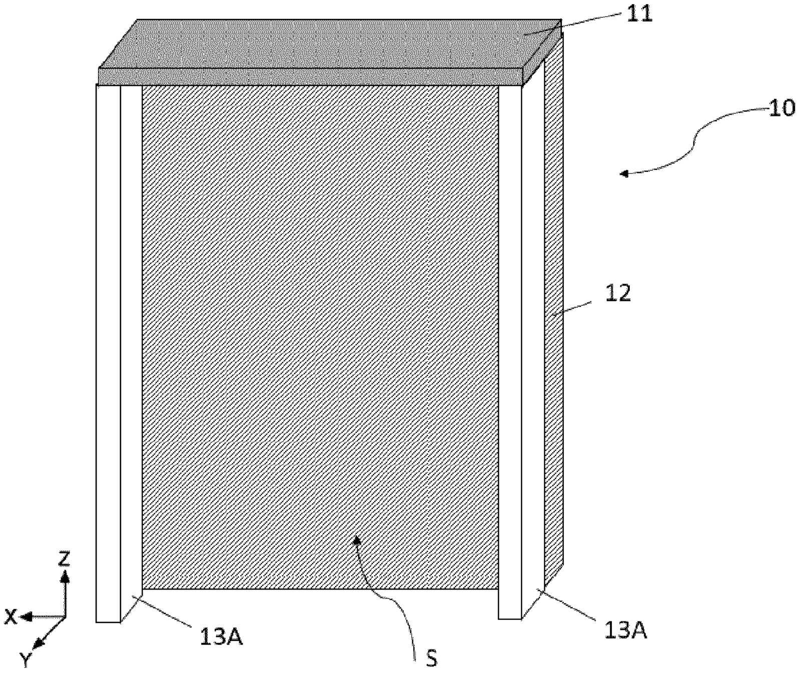
FIG. 3 and FIG. 4 are schematic views of embodiments of an antenna unit with one metallic element according to the invention.
Figure 4:
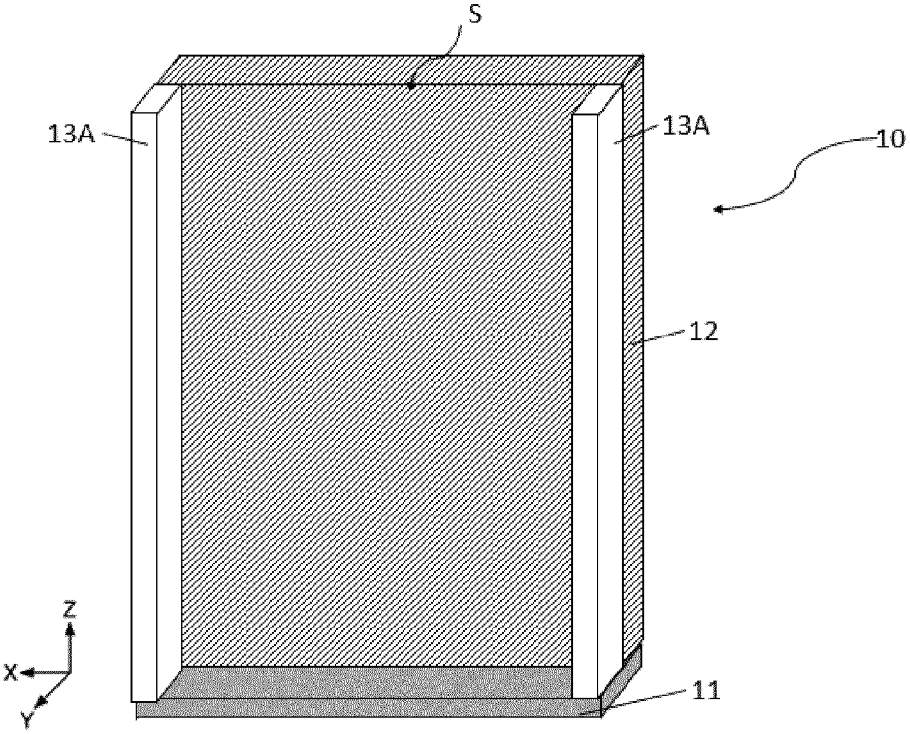
Figure 4A:
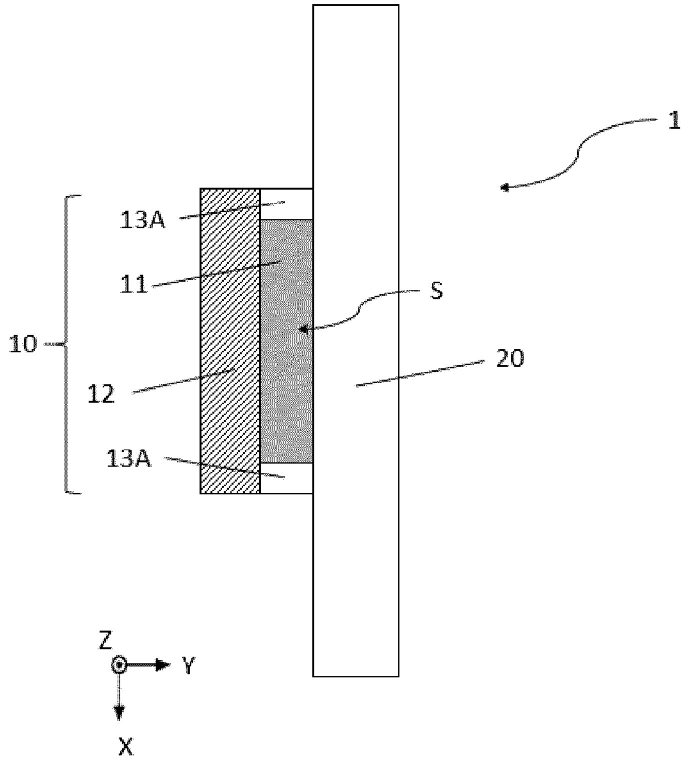
FIG. 4A is a schematic view from the top of embodiments of a glazing unit comprising an antenna unit with one metallic element according to the invention.
Figure 4B:
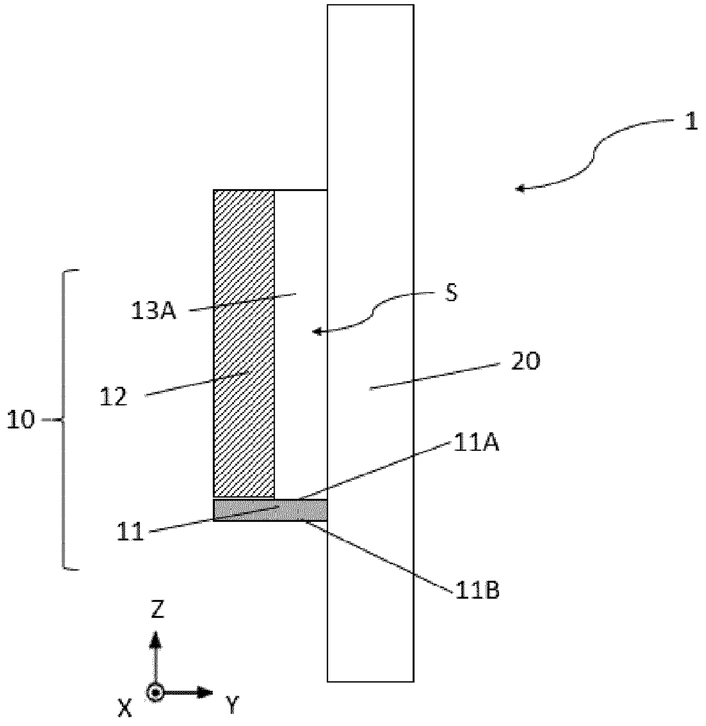
FIG. 4B is a schematic view from the side of embodiments of a glazing unit comprising an antenna unit with one metallic element according to the invention.

For a better understanding, the scale of each member in the drawing may be different from the actual scale. In the present specification, a three-dimensional orthogonal coordinate system in three axial directions (X axis direction, Y axis direction, Z axis direction) is used, the width direction of the glass panel is defined as the X direction, the thickness direction is defined as the Y direction, and the height is defined as the Z direction. The direction from the bottom to the top of the glass panel is defined as the +Z axis direction, and the opposite direction is defined as the −Z axis direction. In the following description, the +Z axis direction is referred to as upward and the −Z axial direction may be referred to as down.

With reference to FIG. 1, a first embodiment of the present invention is described.

As shown in FIG. 1, a glazing unit 1 extending along a plane, P, defined by a longitudinal axis, X, and a vertical axis, Z; having a width, W, measured along the longitudinal axis, X, and a length, L, measured along the vertical axis, Z, comprises a glass panel 20 and an antenna unit 10. The antenna unit 10 is attached to the main surface on the indoor side of the glass panel 20. Then, sunlight or the like is irradiated on the main surface of the glass panel 20 on the side opposite to the interior side.

In some embodiments, the glass panel comprises at least one glass sheet.

In some preferred embodiments, the glass panel comprises at least two glass sheets separated by a spacer allowing to create a space filled by a gas like Argon to improve the thermal isolation of the glass panel, creating an insulating glazing panel. It means that, in these embodiments, the antenna unit is placed outside of the insulating glazing panel on the glass face the most far from the outside face where the sun is directly heating.

The glass panel 20 is a known glass plate used for a window of a building or the like. The glass panel 20 is formed in a rectangular shape in plan view and has a first main surface and a second main surface. The thickness of the glass panel 20 is set according to requirements of buildings and the like.

In some embodiments, the first main surface of the glass panel 20 is set to the outdoor side and the second main surface is set to the indoor side (facing the antenna 11).

In the present embodiment, the first main surface and the second main surface are collectively referred to simply as the main surface in some cases. In the present embodiment, the rectangle includes not only a rectangle or a square but also a shape obtained by chamfering corners of a rectangle or a square. The shape of the glass panel 20 in a plan view is not limited to a rectangle, and may be a circle or the like. Further, the glass panel 20 is not limited to a single plate, and it may be a laminated glass or a double-layered glass.

In another embodiment, the glass panel can be a laminated glass panel to reduce the noise and/or to ensure the penetration safety. The laminated glazing comprises glass panels maintained by one or more interlayers positioned between glass panels. The interlayers employed are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

As the material of the glass panel 20, for example, soda-lime silica glass, borosilicate glass, or aluminosilicate glass can be mentioned.

The glass panel 20 can be manufactured by a known manufacturing method such as a float method, a fusion method, a redraw method, a press molding method, or a pulling method. As a manufacturing method of the glass panel 20, from the viewpoint of productivity and cost, it is preferable to use the float method.

The glass panel 20 can be formed in a rectangular shape in a plan view by using a known cutting method. As a method of cutting the glass panel 20, for example, a method in which laser light is irradiated on the surface of the glass panel 20 to cut the irradiated region of the laser light on the surface of the glass panel 20 to cut the glass panel 20, or a method in which a cutter wheel is mechanically cutting can be used.

The glass sheet can be a clear glass or a coloured glass, tinted with a specific composition of the glass or by applying a coating or a plastic layer for example.

In order to minimize the heat inside the building and inside the space S between the antenna 12 and the glass panel 20, the glass panel 20 may be provided with a coating layers system having a heat ray reflecting function and the like on the second main surface on the interior side of the glass panel 20.

In this embodiment, the coating layers system preferably has an opening at a position facing the antenna unit of the antenna unit 10. Thereby, the glass panel with an antenna can suppress deterioration of the radio wave transmission performance.

The opening can be a surface without the coating layers system or a plurality of small slits or any shape in the coating layers system to become a frequency selective surface in order to let waves pass from one side to the other side of the glass panel and can further suppress deterioration of radio wave transmission performance.

As the coating layers system, for example, a conductive film can be used. As the conductive film, for example, a laminated film obtained by sequentially laminating a transparent dielectric, a metal film, and a transparent dielectric, ITO, fluorine-added tin oxide (FTO), or the like can be used. As the metal film, for example, a film containing as a main component at least one selected from the group consisting of Ag, Au, Cu, and Al can be used.

The glass sheet can be processed, ie annealed, tempered, . . . to respect with the specifications of security and anti-thief requirements. A heatable system, for example a coating or a network of wires, can be applied on the glazing unit to add a defrosting and/or a demisting function for example.

In case of several glass sheets, in some embodiments, each glass sheet can be independently processed and/or coloured, . . . in order to improve the aesthetic, thermal insulation performances, safety, . . .

As shown in FIGS. 2 to 5, the antenna unit 10 comprises a fixing portion 13A for fixing the antenna 12 to the glass panel so that a space S through which air can flow is formed between the glass panel 20 and the antenna 12.

The antenna unit 10 further comprises at least one non-fixing portion and at least one metallic element 11 placed over at least a part of the non-fixing portion of the antenna unit 10.

In addition, the glazing unit 1 can be assembled within a frame or be mounted in a double skin facade or any other means able to maintain a glazing unit.

According to some embodiments according to the invention, the antenna 12 can be a flat plate-like substrate on which the antenna 12 is provided. For instance, the antenna 12 can be a planar antenna like the microstrip patch array, slot array, a dipole antenna, an array of antennas, or the like can be used.

As the metal material forming the antenna 12, a conductive material such as gold, copper, nickel or silver can be used.

According to the invention, the antenna 12 may radiate in the direction of outside (+Y), meaning to the direction of the glass panel, in the direction of inside (−Y), meaning to the opposite direction of the glass panel or in both directions (+Y, −Y).

In some embodiments, the antenna 12 can be provided on a first main surface of the antenna installation substrate. The antenna 12 can be formed by printing a metal material so as to at least partially overlap a ceramic layer provided on the second main surface of the antenna installation substrate. In that embodiment, the antenna 12 is provided on the second main surface of the antenna installation substrate so as to straddle the portion where the ceramic layer is formed and the other portion.

In this embodiment, the ceramic layer can be formed on the second main surface of the antenna installation substrate by a known method such as printing. By providing the ceramic layer, the wiring (not shown) attached to the antenna 12 can be covered or hidden to have a better finish and/or design. Further, in the present embodiment, the ceramic layer is formed on the first main surface but may not be provided.

In the present embodiment, the antenna 12 is provided on the first main surface of the antenna installation substrate, but may be provided inside the antenna installation substrate. In this case, for example, the antenna 12 can be provided inside the antenna installation board in the form of a coil. Further, the antenna 12 itself may be formed in a flat plate shape. In this case, instead of using the antenna mounting board, a flat plate antenna may be directly attached to the fixing portion 13A. The antenna 12 may be provided inside the accommodation container having a surface parallel to the glass panel 20, in addition to being provided on the antenna installation substrate. In this case, in the antenna 12, for example, a flat antenna can be provided inside the storage container.

The antenna 12 preferably has optical transparency to be has discrete as possible. If the antenna 12 has optical transparency, the average solar radiation absorption rate can be lowered on top of the hidden effect.

Preferably, the antenna 12 or the antenna installation substrate is provided in parallel to the glass panel 20. The antenna 12 or the antenna installation substrate can be formed in a rectangular shape in a plan view and has a first main surface and a second main surface. The first main surface is provided so as to face the main surface of the glass panel 20 to be attached and the second main surface is provided in a direction opposite to the main surface side of the glass panel 20.

In some embodiments, the material for forming the antenna installation board is designed according to the antenna performance such as power and directivity required for the antenna 12, and for example, glass, resin, metal, or the like can be used. The antenna installation substrate may be formed to have light transmittance by resin or the like. Since the antenna mounting board 12 is made of a light transmissive material, the glass panel 20 can be seen through the antenna installation board 12, so that it is possible to reduce the obstruction of the field of view seen from the glass panel 20.

The thickness of the antenna installation board can be designed according to the place where the antenna 12 is arranged.

The fixing portion 13A is for forming a space S through which air can flow between the glass panel 20 and the antenna 12 and is for fixing the antenna 12 to the glass panel 20. The fixing portion 13A is attached to the first main surface of the antenna installation substrate. In the present embodiment, the fixing portion 13A is provided in a rectangular shape along the Z-axis direction at both ends in the X-axis direction of the antenna installation substrate. In the present embodiment, the reason why the space S through which air flows is foil led between the glass panel 20 and the antenna 12 is that the local temperature of the surface temperature of the glass panel 20 at the position facing the antenna 12. When the outer main surface of the glass panel 20 is irradiated with sunlight, the glass panel 20 is heated. At this time, if the flow of air is blocked in the vicinity of the antenna unit 10, the temperature of the antenna unit 10 rises, so that the temperature of the surface of the glass panel 20 to which the antenna unit 10 is attached is higher than the temperature of the other surface. The temperature tends to rise more easily. In order to suppress this temperature rise, a space S is formed between the glass panel 20 and the antenna 12. Details regarding this point will be described later.

The material for forming the fixing portion 13A is not particularly limited as long as it can be fixed to the contact surface of the antenna 12 and the glass panel 20. For example, an adhesive or an elastic seal can be used. Materials for forming adhesives and sealing materials.

The average thickness t of the fixing portion 13A is preferably 0.5 mm to 20 mm. If the average thickness t is too small, the thickness of the space S formed by the antenna 12 and the glass panel 20 becomes small (thin), and the air does not smoothly flow through the space S. By making the space S between the antenna 12 and the glass panel 20 slight, the thickness of the space S becomes thin, but the space S can function as a heat insulating layer. Even if the thickness of the space S is small, a certain amount of air flows. That is, when sunlight is irradiated on the glass panel 20, the temperature of the glass panel 20 rises, and the temperature of the air in the space S also rises. As the temperature of the air rises, the air expands more, so that the upper air in the space S rises and flows out from the upper side of the space S to the outside. Then, the air sequentially rises from the lower side in the space S. Therefore, even when the thickness of the space S is small, the air tends to flow as the temperature of the air in the space S rises.

On the other hand, when the average thickness t of the fixing portion 13 A is increased, the space S is increased (thickened) by that much, so that the air flow in the space S is preferable. However, since the distance between the main surface of the glass panel 20 and the antenna 12 increases (increases), there is a possibility that the electromagnetic wave transmission performance may be hindered. Further, since the antenna unit 10 protrudes largely from the main surface of the glass panel 20, the antenna unit 10 becomes an obstacle to the glass panel 20.

Figure 5:
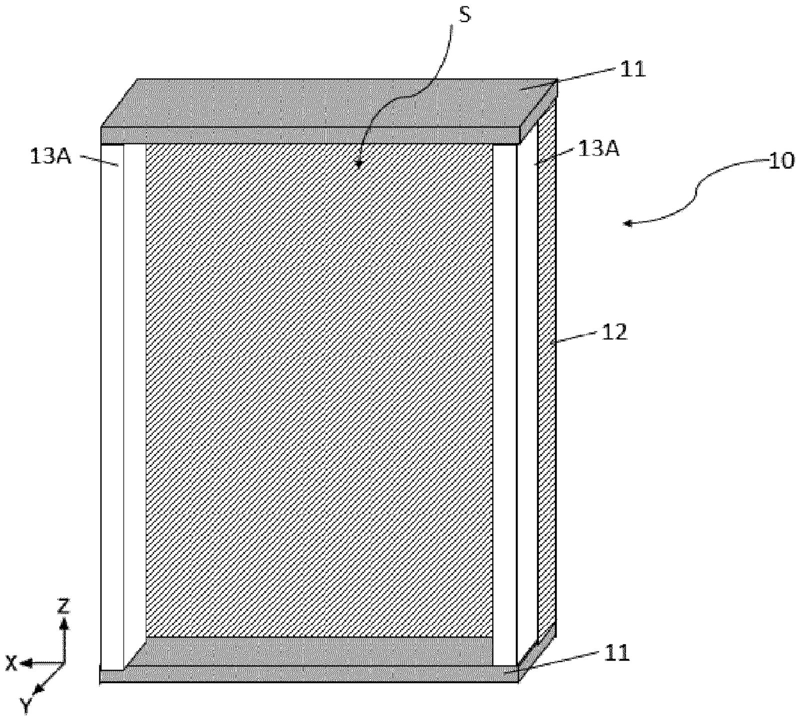
FIG. 5 is a schematic view of one embodiment of an antenna unit with two metallic elements according to the invention.
Figure 6:
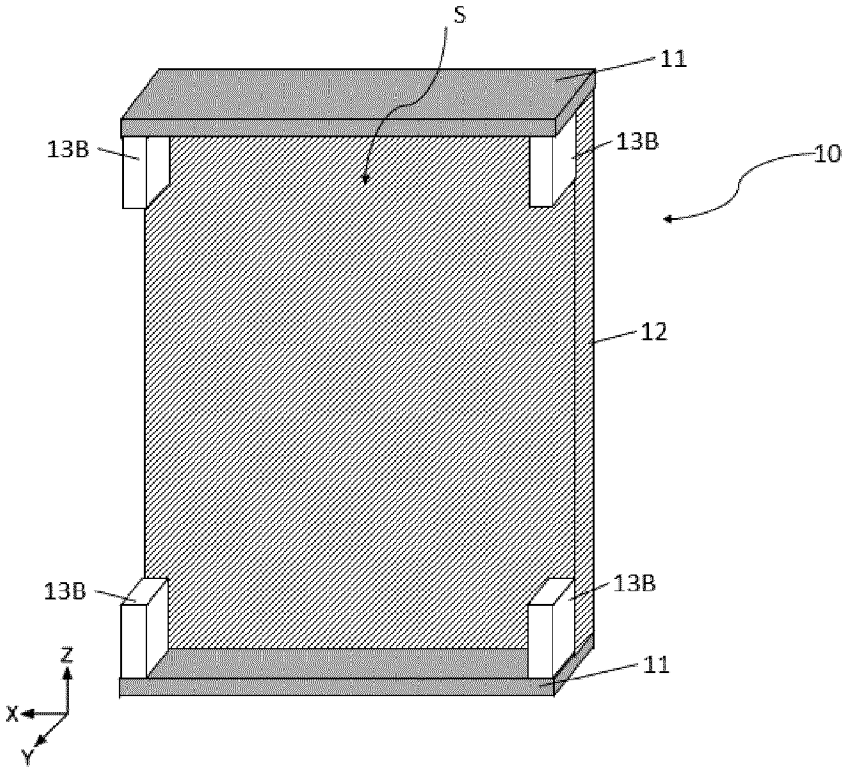
FIG. 6 is a schematic view showing an example of another form of the fixing portion according to the invention

Although the embodiment in which the fixing portion 13 A is provided at two locations of the antenna 12 has been described so far, the mode of the fixing portion 13A is not limited as long as the air can flow in the space S. An example of another form of the fixing portion 13B. As is shown in FIG. 5, the fixing portion can have another form. According to the invention, the fixing portion 13B is provided at both ends in the X-axis direction of the first main surface of the antenna 12 and at both ends in the Z-axis direction, respectively, and the antenna 12 is fixed to the glass panel with four fixing portions Further, among the four fixing portions 13B, only one fixing portion 13 B provided in the −Z axis direction is provided at the lower end of the antenna installation substrate, for example, near the center, and the antenna installation substrate 12 is fixed to the glass panel 20 by three. It may be fixed by the portion 13B. It is understood that a plurality of small fixing elements can be used instead of long fixing elements as shown in FIGS. 2 to 4A.

When the average thickness t of the fixed portion 13A is within the above range, the air flowing into the space S can pass through the space S due to a slight increase in temperature. As a result, the glass panel 20 can be prevented from being heated by the air flowing in the space S, so that excessive temperature rise of the antenna 12 can be suppressed. The average thickness t of the fixing portion 13A is more preferably 2 mm to 16 mm, further preferably 4 mm to 14 mm, and particularly preferably 6 mm to 12 mm.

In the present embodiment, the thickness refers to the length in the vertical direction (Y axis direction) of the fixed portion 13A with respect to the contact surface of the antenna 12 and the glass panel 20. In the present embodiment, the average thickness t of the fixed portion 13A is an average value of the thickness of the fixed portion 13A. For example, when measured in several places (for example, about three places) at an arbitrary place in the Z axis direction in the cross section of the fixed part 13A, it means the average value of the thicknesses of these measurement points.

As described above, the space S is formed between the glass panel 20 and the antenna 12 by the fixing portion 13A and allows air to flow. Therefore, the thickness of the space S is substantially the same as the average thickness t of the fixed portion 13A.

In the antenna unit 10, air flows into the space S from the lower side (−Z axis direction) of the antenna 12. The air flowing into the space S can freely flow in the space S toward the upper side (+Z axis direction) of the antenna 12. The air flowing through the space S flows out from the upper side (+Z axis direction) of the antenna 12 while contacting the main surface of the glass panel 20 at a position facing the antenna 12. By contacting the air in the space S with the main surface of the glass panel 20 at a position facing the antenna 12, the main surface of the glass panel 20 at the position facing the antenna 12 is exposed to outside air and the sun excessive temperature rise due to light etc. is suppressed. In addition, since the fixing portion 13A is continuously formed in the vertical direction, the temperature difference between the upper portion and the lower portion in the space S is increased accordingly. Therefore, due to the so-called chimney effect, the flow velocity of the air flowing in the space S can be increased.

In the antenna unit 10, a fixing portion 13 A is provided on the antenna 12 so that a space S through which air can flow is formed between the glass panel 20 and the antenna 12. Thus, even if the glass panel 20 is heated by outside air, sunlight, or the like, excessive temperature rise of the main surface of the glass panel 20 at the position facing the antenna 12 can be suppressed. Therefore, it is possible to reduce the possibility of occurrence of thermal cracks in the glass panel 20 at the position facing the antenna 12. Therefore, the antenna unit 10 can be stably installed on the glass panel 20 without causing damage to the glass panel 20.

The non-fixing portion is portion of the antenna unit not in contact with the glass panel 20 allowing the air to flow though compared to the fixing portion.

In some embodiments, the fixing portion can let air flows by using holes, small elements instead of large ones, . . .

According to the invention, the metallic element 11 allows the level of back radiation of the wave of the antenna 12 on the glass panel 20 to be decreased since the metallic element 11 prevents the reflection from the glass panel 20 scattered behind the antenna 12 while allowing the air flow, at least inside the space S.

The metallic element can be a metal-based element, an element with a core and surfaces where at least the surface in front of the space S is metalized. In some embodiment, the metallic element is a metal coated plastic element.

Material used for the metallic element may be a high conductive material such as Cu, Ag, Al, . . . or mix of metal to minimize the back radiation.

It is understood that the surface of the metallic element depends on the dimensions of the antenna unit.

The metallic element 11 has two majors surfaces 11A, 11B where one is in front of space S.

Preferably, the metallic element 11 is a plate with one of these majors surface 11A is in front with the space S and the other major surface 11B is slightly parallel to the major surface in front of space S.

Preferably, the thickness of the metallic element is at least two times the skin depth of the metallic material used in the metallic element on the desire frequency in order to minimize the back reflection on the glass panel.

In some embodiments of the invention, the metallic element can be over the entire of at least one non-fixing portion to minimize the back reflection on the glass panel. Preferably, the metallic element cover the antenna at least near the non-fixing portion covered by the metallic element.

The antenna unit 10 is preferably provided at a position separated from the glass panel 20 by a predetermined distance L or more in plan view. The predetermined distance L is preferably 20 mm. For example, when the glass sheet is directly exposed to the sunlight, the temperature of the glass panel 20 rises to a high temperature. In some cases, there is a possibility that thermal cracks may occur in the portion of the glass panel or the vicinity thereof located at the position facing the antenna unit 10. In particular, by attaching the antenna unit 10 to the second main surface of the glass panel 20, the flow of air on the second main surface of the glass panel 20 at a position facing the antenna unit 10 is hindered. In this case, the temperature of the portion of the glass panel 20 located opposite the antenna unit 10 is further increased. As a result, there is a possibility that the thermal distortion occurring in the portion of the glass panel 20 at the position facing the antenna unit 10 or in the vicinity thereof may be further increased.

The predetermined distance L is more preferably 25 mm, further preferably 30 mm, particularly preferably 40 mm, most preferably 50 mm.

In some embodiments according to the invention, even if the temperature of the portion of the glass panel 20 located opposite the antenna unit 10 is increasing, and the metallic elements cover all non-fixing portions, the air flows inside de space S is enough to not increase to much. Metallic elements can be used as energy dissipater on top of reducing back reflection of the glass panel.

According to the invention and as shown in FIGS. 7 to 22, to dissipate more heat, the antenna unit may have at least one hole in order to facilitate to air flow inside the space S.

The at least one hole 14 pierces the metallic element 11 from the major surface 11A in front of space S to the opposite major surface 11B in order to ensure the air flow from the space S to outside of the antenna unit 10.

The at least one hole 14 can have any shape, such as cylindrical-shape, rectangular parallelepiped shape, macaroni-like shape or corkscrew shape or any other shape able to maximize the air flow from space S to outside of the antenna unit 10, along the Z axis in the case of major surfaces of the metallic element 11 are in the X-Y plan.

The at least one hole 14 can be oriented with a certain angle from the Z axis in any direction in the case of major surfaces of the metallic element 11 are in the X-Y plan or any other orientation as far as the at least one hole pierces the majors surfaces (11A, 11B) of the metallic element.

FIGS. 7 to 21, according to some embodiments of the present invention, show an antenna unit 10 in a general form of a rectangular parallelepiped. It is understood that the shape of the antenna unit can have any other shape or design as long as there is a space S between the antenna 12 and the glass panel 20.

In these schematically representation of the invention, the fixing portion comprises two fixing elements placed symmetrically on borders of the antenna 12 as for FIGS. 2 to 6. The antenna unit 10 comprises two metallic elements 11 placed over the non-fixing portions.

Preferably, the metallic element 11 is over the entire surface of the non-fixing portion where the metallic elements 11 is over, and more preferably the metallic element 11 is over the antenna 12.

To maximize the air flow, it is better to withdraw the metallic element in the other hand to minimize the back reflection of the waves, the metallic element has to cover the maximum of the space S. The present invention solves this problem by optimizing the air flow and in the same time minimizing the back reflection of the glass panel 20.

Surprisingly, adding at least one hole to the metallic element allows to solve this problem.

According to some embodiments, embodiments of FIGS. 3, 4, 4A and 4B, at least one hole can be on the metallic element 11. Other embodiments explained here under can be combined with these embodiments in order to have several holes for example.

Figure 7:
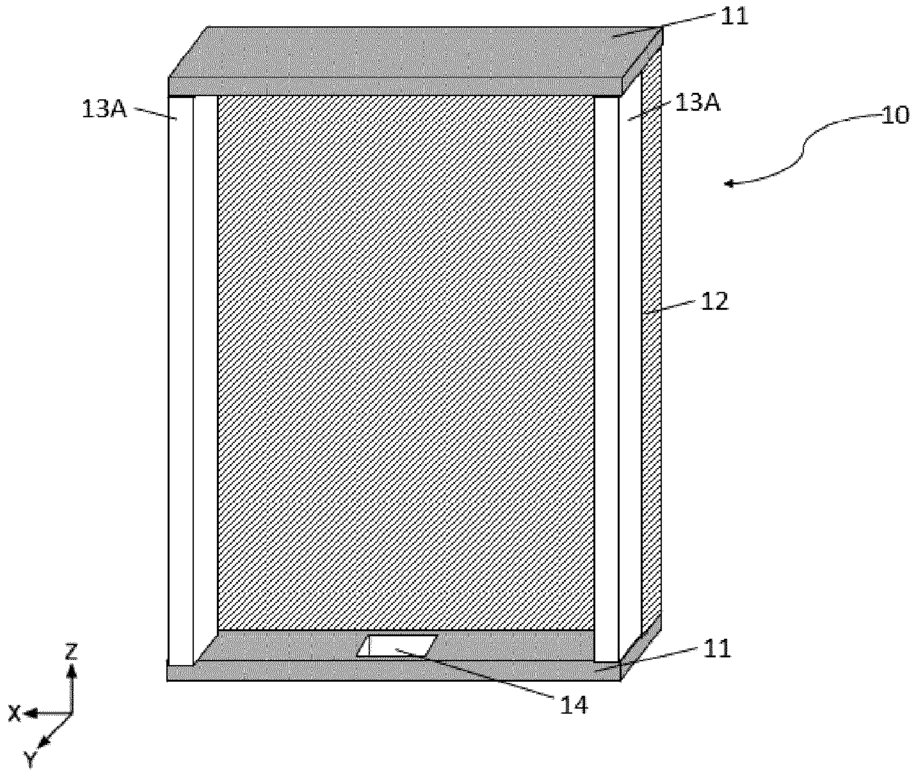
FIG. 7 and FIG. 8 are schematic views of embodiments of an antenna unit with a hole on one metallic element according to the invention.
Figure 8:
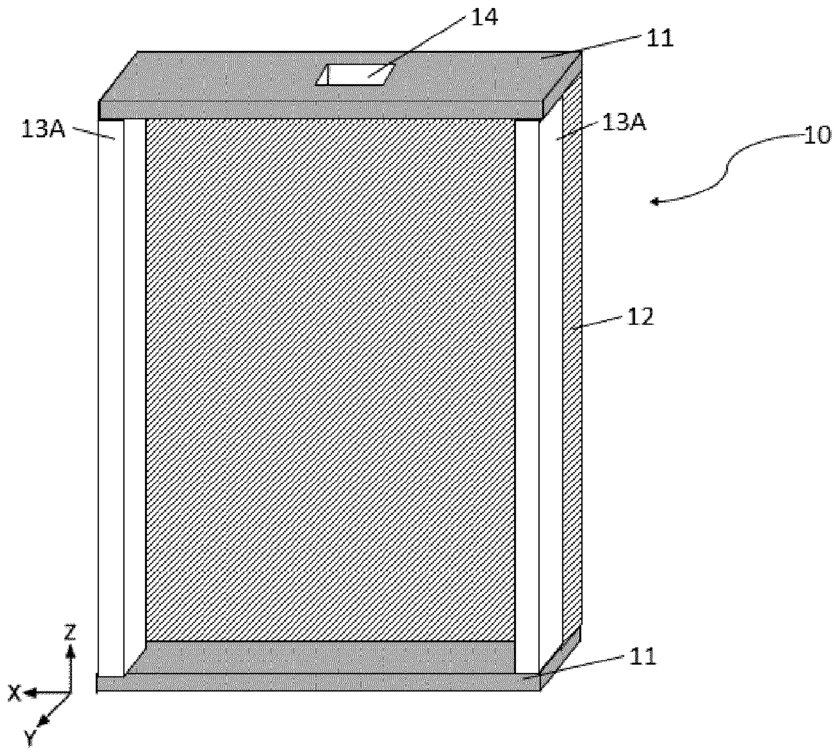

According to the invention and as shown in FIGS. 7 and 8, one of the metallic elements has a hole 14 to let air flows and to facilitate the dissipation of heat.

Figure 9:
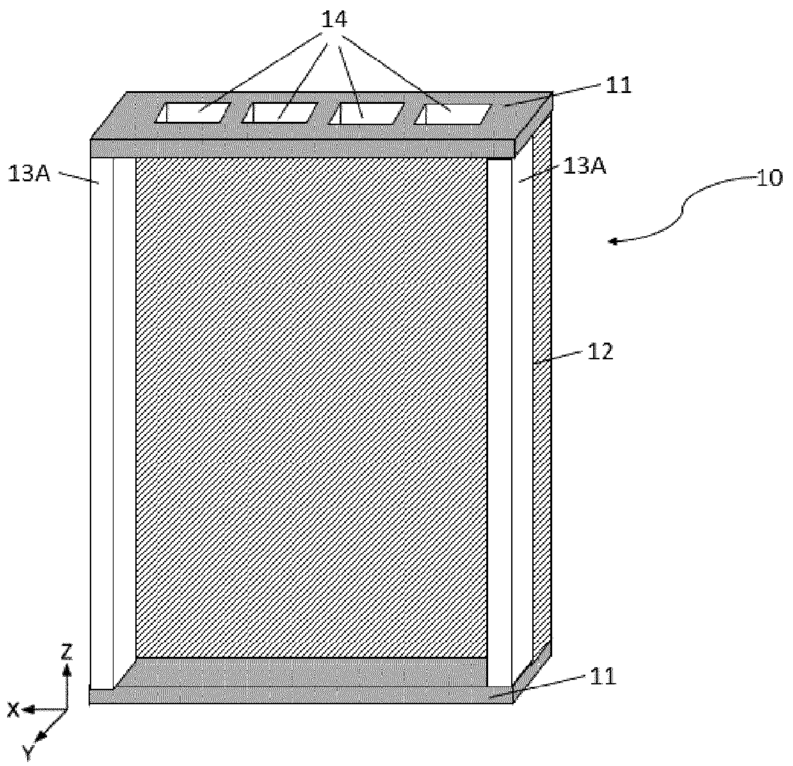
FIG. 9 and FIG. 10 are schematic views of embodiments of an antenna unit with several holes on one metallic element according to the invention.
Figure 10:
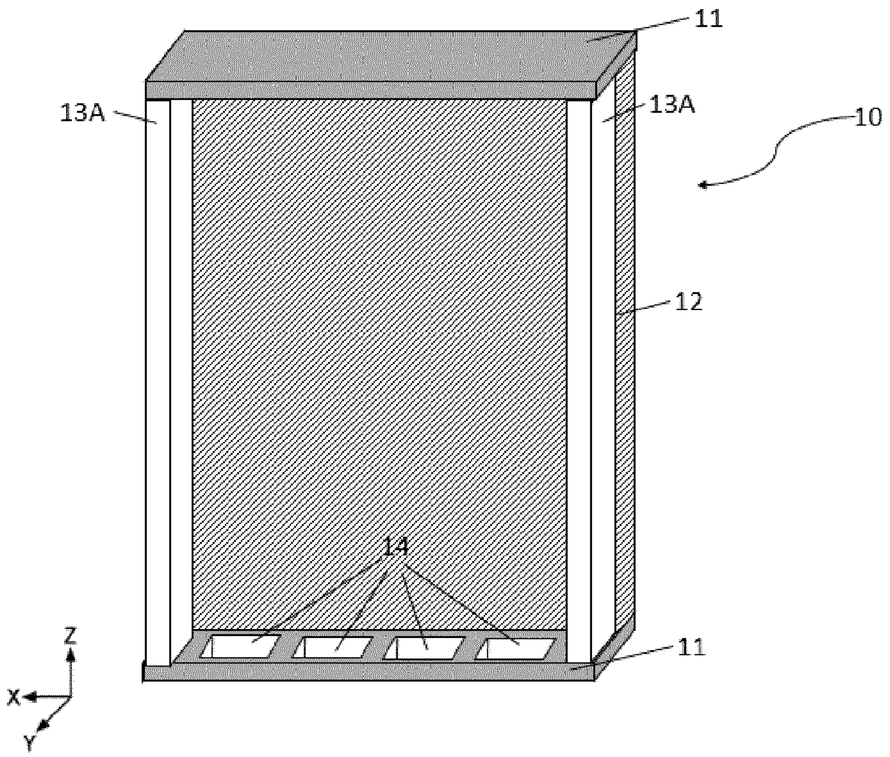

As shown in FIGS. 9 and 10, to improve the dissipation of heat, one of the metallic elements has at least two holes 14, and preferably several holes 14.

The hole or holes 14 pierce the metallic element 11. Holes can have any shape as far as air can flow thought. Some limitations can be made depending of materials used for the metallic element and also the process of manufacture.

Figure 11:
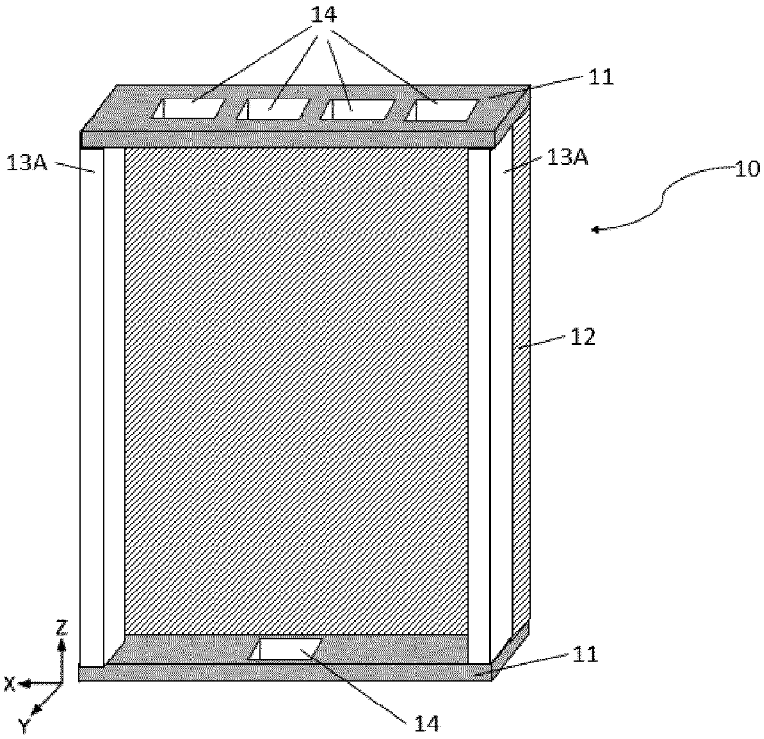
FIG. 11 and FIG. 12 are schematic views of embodiments of an antenna unit with two metallic element with several holes on one metallic element and one hole on the other metallic element according to the invention.
Figure 12:
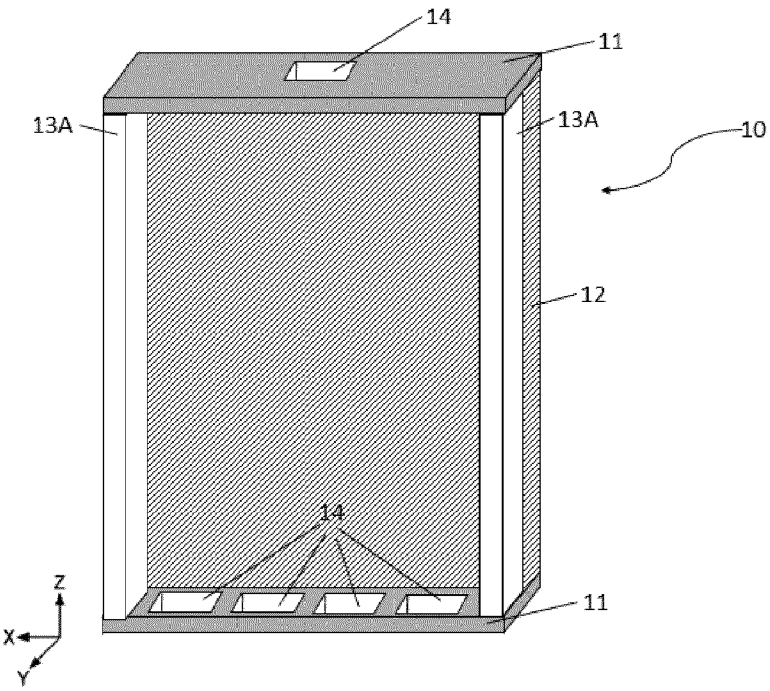

Holes can be placed at several places in the metallic element in order to maximize the air flow. In case of metallic element along the X axis with the thickness in Z axis, holes are in the Z-axis but could oriented meaning that the surface of the hole on the top surface of the metallic element Preferably and as shown in FIGS. 11 and 12, on metallic element 11 can have several holes while a second metallic element has one hole. This configuration allows a good air flow through the space S. More preferably, to ensure an important air flow, the metallic element placed at the top of the antenna unit, meaning at the higher +Z, has more holes that the lower metallic element as shown in FIG. 11.

Figure 13:
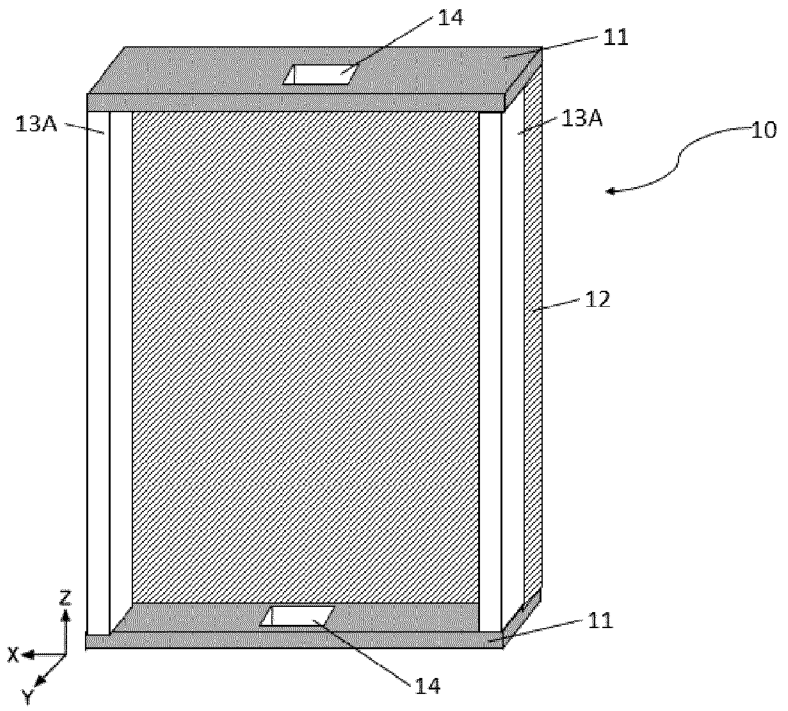
FIG. 13 is a schematic view of one embodiment of an antenna unit with two metallic elements with one hole on each according to the invention.
Figure 14:
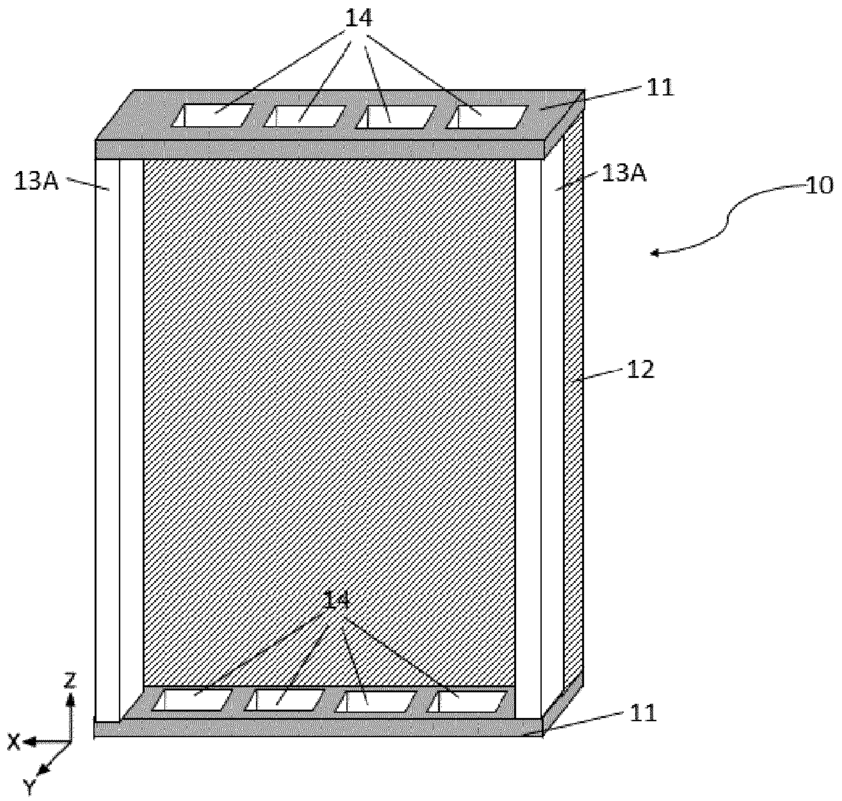
FIG. 14 is a schematic view of on embodiment of an antenna unit with two metallic elements with several holes on each according to the invention.
Figure 15:
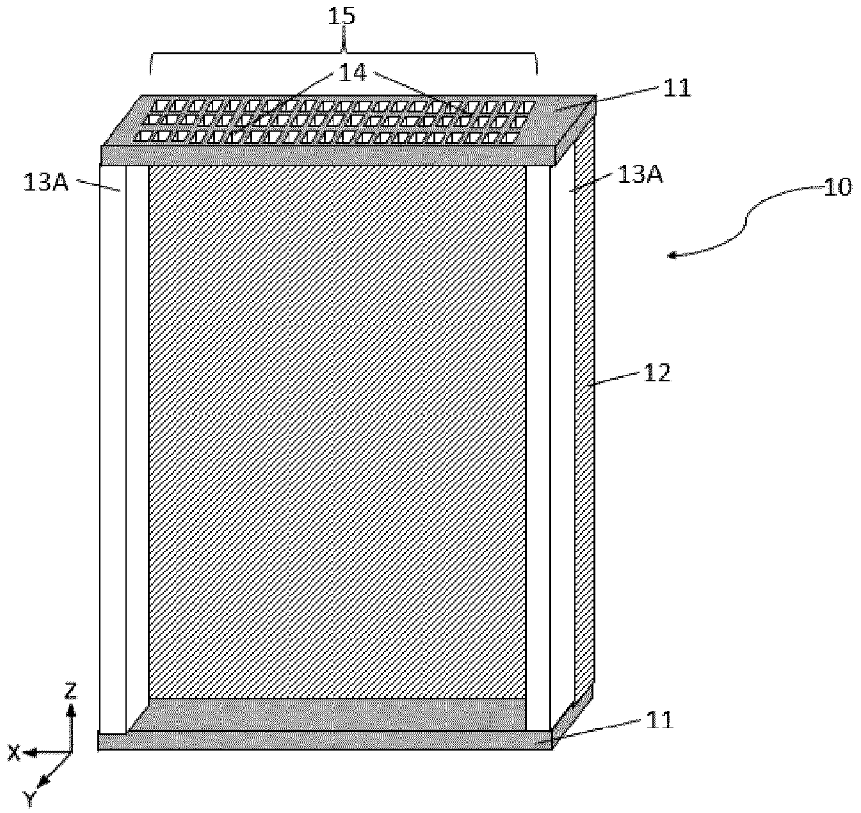
FIG. 15 and FIG. 16 are schematic views of embodiments of an antenna unit with several holes forming a mesh on one metallic element according to the invention.
Figure 16:
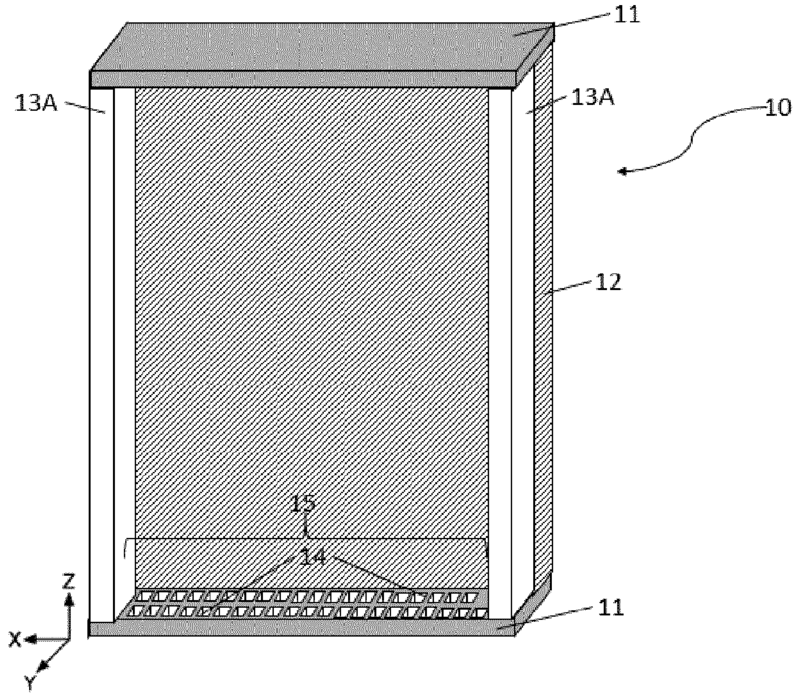
Figure 17:
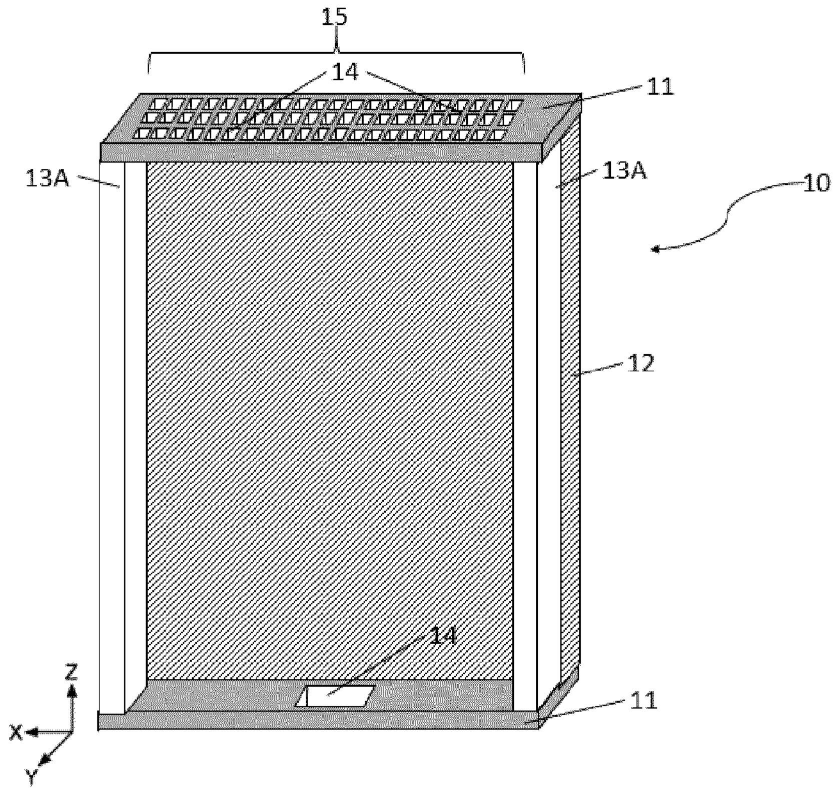
FIG. 17 and FIG. 18 are schematic views of embodiments of an antenna unit with two metallic elements with several holes forming a mesh on one metallic element and one hole on the other metallic element according to the invention.
Figure 18:
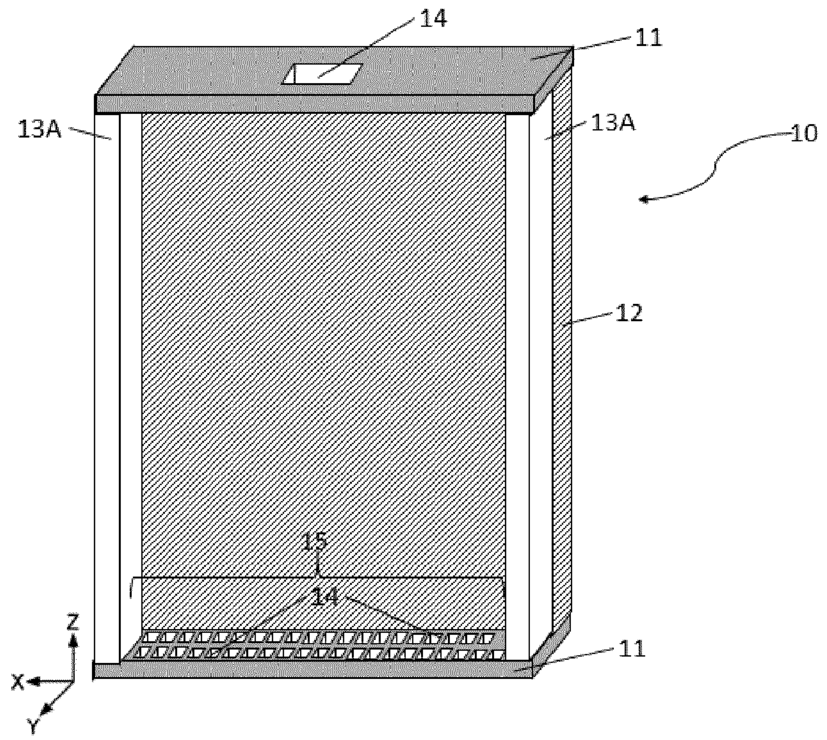
Figure 19:
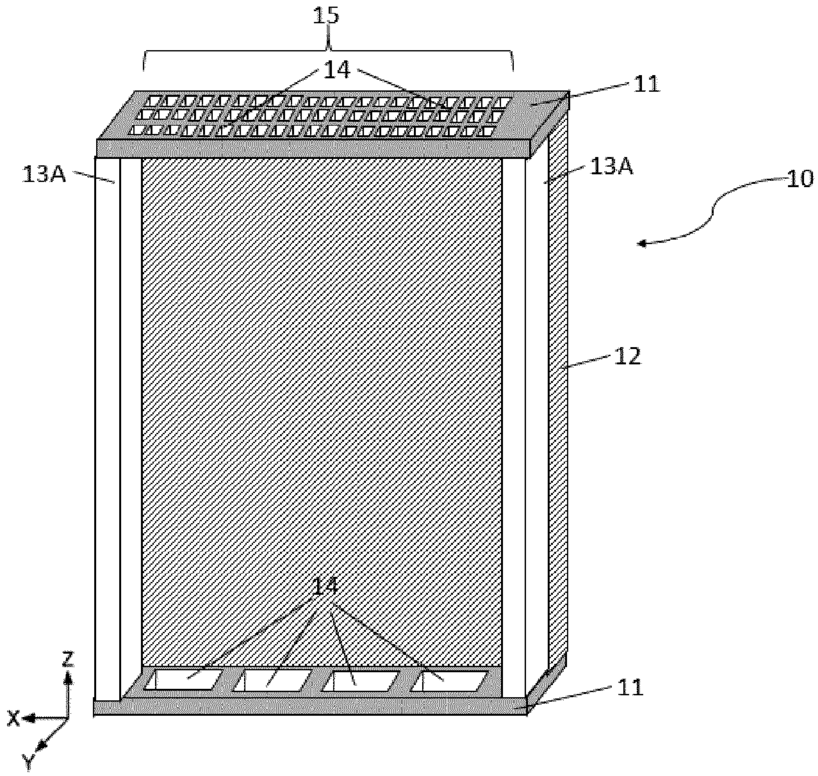
FIG. 19 and FIG. 20 are schematic views of embodiments of an antenna unit with two metallic elements with several holes forming a mesh on one metallic element and several holes on the other metallic element according to the invention.
Figure 20:
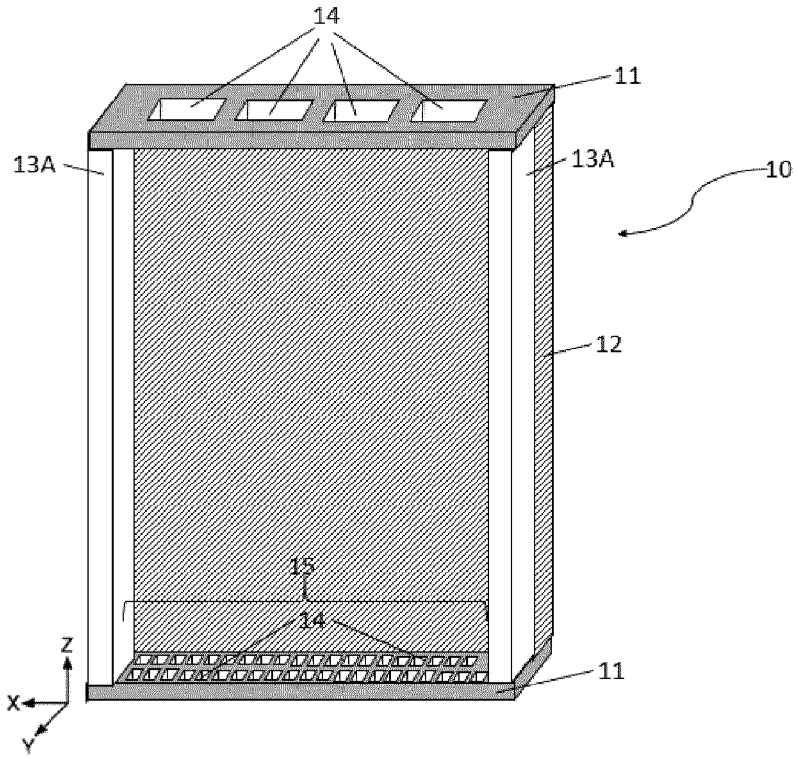
Figure 21:
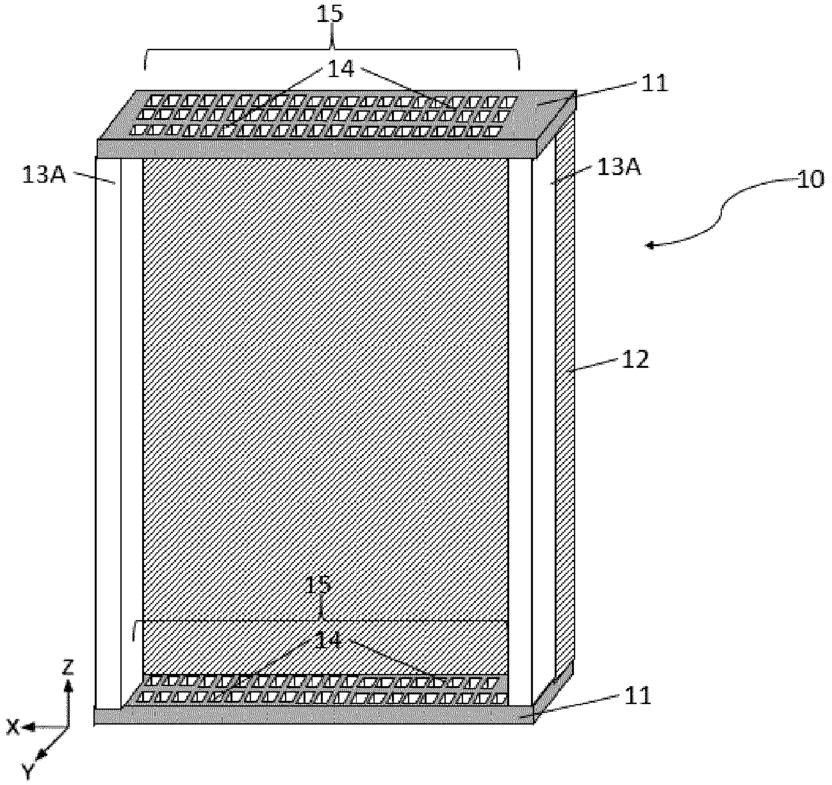
FIG. 21 is schematic view of embodiments of an antenna unit with two metallic elements with several holes forming a mesh according to the invention.

As shown in FIGS. 13 and 14, metallic elements can have one hole on each or several holes on each. Size, dimensions, design and number of holes can be adapted to maximize the air flow through the space S. For example, a larger hole on the higher metallic element.

In case of metallic elements are placed on the X axis of the antenna unit, according to the invention, all these embodiments with at least one hole can be adapted.

In order to improve the air flow by minimizing the back reflection of the glass panel, preferably and as shown in FIGS. 15 to 21, the at least one metallic element 11 further comprises at least a meshed portion 15 corresponding with the space S of the antenna unit 10. The meshed portion 15 can be understand as a plurality of small holes 14.

Preferably, the largest dimension of the at least one hole may not be larger than 0.4 times the effective wavelength and preferably the largest dimension of every hole of the metallic element may not be larger than 0.4 times the effective wavelength. This wavelength is normalized to effective permittivity of the interface on which metallic structure is placed. In the present invention, as interfaces are air to air, the effective permittivity is 1. The above formula about the maximum dimension of the aperture of the hole (0.4 times the effective wavelength) remains valid in case of several holes and meshed portion.

The size of the meshed portion 15 as the dimensions of small holes 14 that composed it can be adapted to situations as frequencies to minimize in term of back reflection as air flow rate needed to drop the overheat.

Preferably, in some embodiments, the meshed portion has holes with square surface. Dimensions of squares are linked to the cut-off frequencies to minimize the back reflection of the glass panel.

As shown in FIGS. 17 to 21, in case of several metallic elements, one of the metallic elements 11 can have a meshed portion 15 and another metallic element 11 can have one hole 14, several holes 14 or a meshed portion 15 in order to maximize the air flow by minimizing the back reflection of the glass panel.

In a preferred embodiment, metallic elements 11 of the antenna unit 10 cover the entire surface of the non-fixing portion and the antenna 12. Metallic elements 11 of the antenna unit 10 have a meshed portion on this entire surface.

Figure 22:
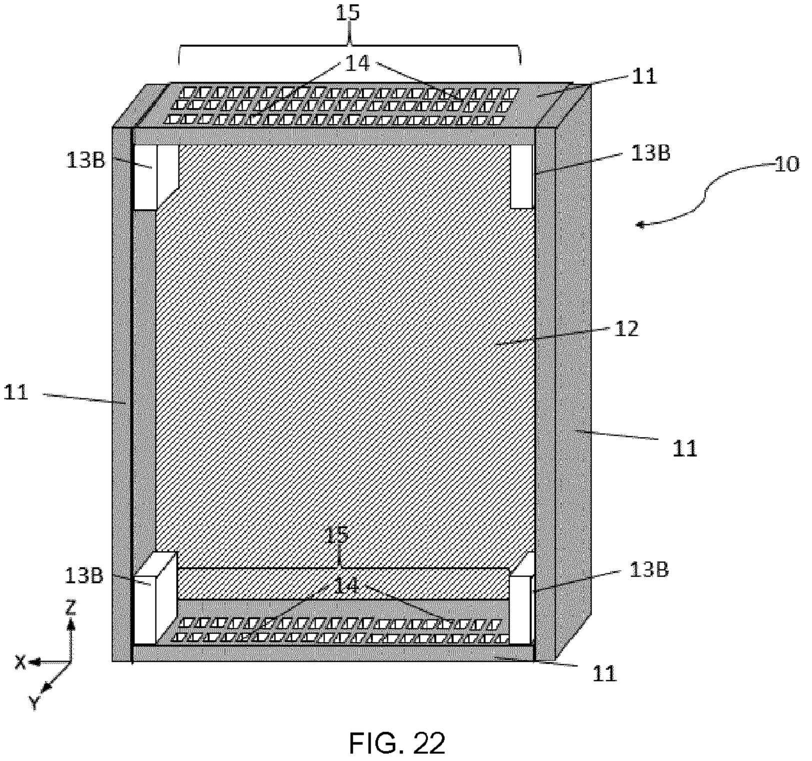
FIG. 22 is schematic view of embodiments of an antenna unit with two metallic elements with several holes forming a mesh and showing an example of another form of the fixing portion according to the invention.

In a preferred embodiment according to the invention, as shown in FIG. 22, fixing portion comprises small fixing elements. Metallic elements cover the entire surface of the non-fixing portion to minimize the back reflection of the glass panel.

In this embodiment, some metallic elements can have at least a hole. Preferably, at least two metallic elements have meshed portion and more preferably all metallic elements have a meshed portion.

Another way to have an better air flow by minimizing the back reflection according to the invention, is to place at least one hole on the fixing portion or the fixing portion comprises small fixing elements instead of one large one in order to let the air flows between these fixing elements and/or inside the at least one hole.

In some embodiments, metallic element can also covers fixing portion to minimize more the back reflection and/or fixing portion can be metallized to create a metallic element on it.

Figure 23:
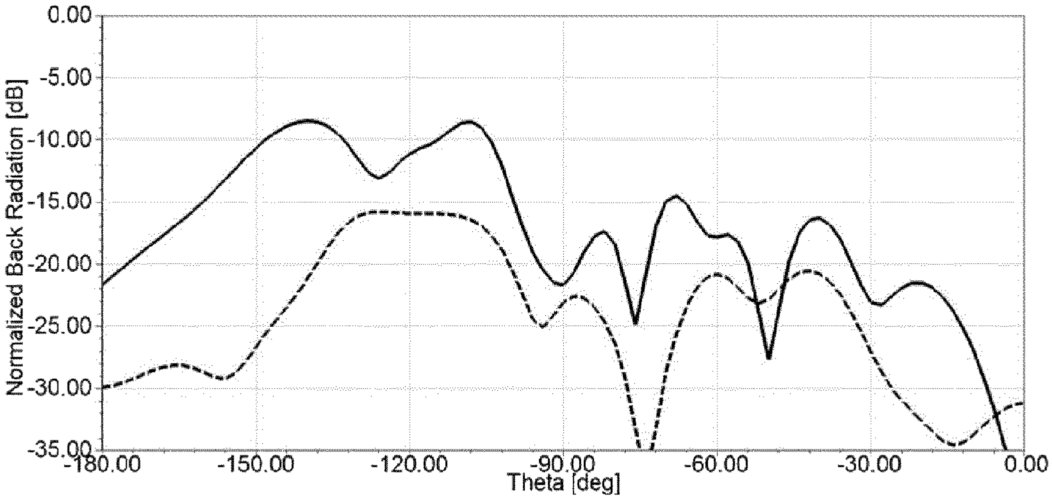
FIG. 23 is a diagram showing a simulation result of normalized back radiation [dB] of the glass panel comparing an antenna unit with and without metallic element.

As shown in FIG. 23, the normalized back radiation ([dB]—solid curve) of an glazing unit with an antenna unit without metallic element is higher than normalized back radiation ([dB]—dashed curve) of an glazing unit with an antenna unit with at least one metallic element where Theta ([Deg]) represents the angle between the Z axis and Y axis, meaning that theta=0 is top of the antenna unit, theta=180° is bottom of the antenna unit and theta=−90° is behind the antenna (−Y)).

The back reflection of the glass panel 20 is significantly reduced for an antenna unit 10 according to the invention. This embodiment comprises an antenna unit 10 with a rectangular antenna, as shown in FIGS. 5 to 22 and where metallic elements cover at least non-fixing portions. Same behaviour can be simulated in presence of at least one hole 14 on the metallic element 11 when the maximum dimensions of the hole are in direct link with the cut-off frequency of the aperture of the hole.

Since the glass panel 20 is provided with the antenna unit 10, it is possible to reduce the possibility of occurrence of thermal cracks in the portion of the glass panel 20 located opposite the antenna unit 10 while minimizing the back reflection of the glass panel 20 in the portion of the glass panel located opposite the antenna unit 10. Therefore, the glass panel 20 with an antenna can be suitably used as a glass panel for a window glass of existing or new buildings, houses and the like.

Further, in a glazing unit according to the invention, the antenna unit 10 can be provided on the second main surface on the indoor side of the glass panel 20. Thereby, it is possible to prevent the antenna unit 10 from damaging the external appearance of the building, and it is possible to prevent the antenna unit 10 from being exposed to the outside air, so that the durability can be improved. Furthermore, in the glass panel 20 with an antenna, the antenna unit 10 is provided on the upper side of the glass panel 20 and on either one of the left and right sides. Therefore, by passing the wiring connected to the antenna of the antenna unit 10 from the glass panel to the ceiling back side, the wall, etc., it is possible to reduce the number of wires exposed to the glass panel 20 and the wall inside the building interior it can.

Further, since the antenna unit 10 is provided on the glass panel 20, there is no need to provide the glass panel 20 with the antenna on the roof of the building or the like. Therefore, since the glass panel 20 with an antenna can be made unnecessary for installation at a high place such as the roof of a building, it can be easily installed in a building. Further, for example, even when the antenna unit 10 is broken and needs to be replaced, the antenna unit 10 can be replaced easily in a short time.

The invention claimed is:

1. A glazing unit extending along a plane, P, defined by a longitudinal axis, X, and a vertical axis Z; having a width, W, measured along the longitudinal axis, X, and a length, L, measured along the vertical axis, Z, comprising:
- a glass panel; and
- an antenna unit,
- wherein the antenna unit comprises:
  - an antenna;
  - a fixing portion for fixing the antenna to the glass panel so that a space through which air can flow is formed between the glass panel and the antenna;
  - at least one non-fixing portion which is a portion of the antenna unit not in contact with the glass panel; and
  - at least one metallic element placed over at least a part of the non-fixing portion of the antenna unit, and
- wherein the at least one metallic element further comprises at least one hole corresponding with the space of the antenna unit such that air can flow through the at least one hole from the space to outside of the antenna unit.

2. The glazing unit according to claim 1, wherein the antenna unit comprises two non-fixing portions and wherein the at least one metallic element is placed over at least a part of at least one of the non-fixing portions.

3. The glazing unit according to claim 2, wherein the antenna unit comprises first and second metallic elements, the first metallic element is placed over at least a part of one of the non-fixing portions and the antenna unit and the second metallic element is placed over at least a part of the second non-fixing portion of the antenna unit.

4. The glazing unit according to claim 1, wherein the at least one metallic element further comprises a meshed portion corresponding with the space of the antenna unit.

5. The glazing unit according to claim 1, wherein a largest dimension of the at least one hole of the at least one metallic element is at most 0.4 times an effective wavelength.

6. The glazing unit according to claim 1, wherein a largest dimension of every hole of the at least one metallic element further is at most 0.4 times an effective wavelength.

7. The glazing unit according to claim 1, wherein a largest dimension of every hole of every metallic element further is at most 0.4 times an effective wavelength.

8. The glazing unit according to claim 1, wherein the glass panel comprises at least one glass sheet.

9. The glazing unit according to claim 8, wherein the glass panel comprises two glass sheets separated by a spacer.

10. The glazing unit according to claim 1, wherein the at least one metallic element covers the at least one non-fixing portion and the antenna at least near the at least one non-fixing portion.

11. The glazing unit according to claim 1, wherein the at least one metallic element covers the fixing portion.

12. The glazing unit according to claim 1, wherein the glass panel is at least partially covered by a coating system.

13. The glazing unit according to claim 12, wherein the coating system has an opening in front of the antenna unit.

14. The glazing unit according to claim 1, wherein the glass panel is separated from the antenna unit at a distance of 20 mm to 50 mm in plan view.

* * * * *